June 4, 1929.  C. F. HIRSHFELD  1,716,130
METHOD OF SIMULTANEOUSLY SEPARATING MIXED LIQUIDS OF DIFFERENT
BOILING POINTS AND GENERATING POWER
Filed March 6, 1922
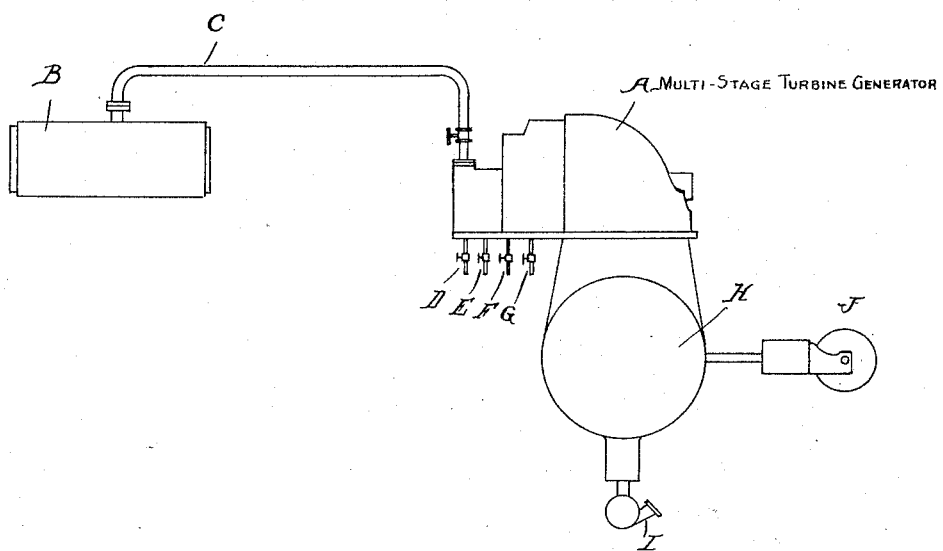
Inventor
Clarence F. Hirshfeld
By Whittemore Hulbert Whittemore
+Belknap
Attorney Patented June 4, 1929.

1,716,130

UNITED STATES PATENT OFFICE.

CLARENCE F. HIRSHFELD, OF DETROIT, MICHIGAN.

METHOD OF SIMULTANEOUSLY SEPARATING MIXED LIQUIDS OF DIFFERENT BOILING POINTS AND GENERATING POWER.

Application filed March 6, 1922. Serial No. 541,296.

The invention relates to the art of fractional distillation and is more particularly applicable to the separation of oils from oil-containing shales. It is well known that there are large oil shale deposits available which have a vast potential capacity for supplying petroleum oils and their by-products and many attempts have been made to utilize this source of supply. However none of the efforts thus far made have been commercially successful, due principally to the fact that the yield obtainable has not been large enough to cover the cost of manufacture. It is obvious that any further by-products which might be obtained during the distillation would offset a part of the cost of distillation, and one of the objects of my invention is to provide an additional by-product in the form of generated power.

Another object is to provide a method for fractional distillation wherein a part of the heat which is used in forming the vapors is again utilized for the performance of useful work. These and other objects of my invention are obtained by the novel method as hereinafter set forth.

The drawing is a diagrammatic view illustrating an apparatus for carrying out my improved method.

It is a well known principle of fractional distillation that where there is a mixture of vapors having different condensing points, heat absorbed from the mixture will lower the temperature of the vapors and will first condense the vapor having the highest condensing point and then successively condense the vapors having lower condensing points. In this manner it is possible to fractionate mixed vapors by separately collecting the condensates resulting from the gradual cooling of the vapors. The ordinary method for cooling the vapors is by means of radiation or conduction whereby the heat of the vapors is lost to the cooling medium.

With my improved method the cooling of the mixed vapors is accomplished by passing them through a multiple expansion power producing apparatus wherein the expansion of the vapors provides the cooling effect for the condensation of the vapors and at the same time is utilized for the production of useful work. In the preferred form, the apparatus consists of a multi-stage turbine generator A which is connected to the still B by a conduit C. Each stage of the turbine is provided with a drain and the fractions which are condensed in the different stages are drawn off separately through these drains, as indicated at D, E, F and G. The vapors which remain uncondensed in the above stages are passed into the condenser H and the condensates withdrawn through the pump I. In case there is any permanent gas which results from the distillation this may be withdrawn by the vacuum pump J.

In carrying out the process, as above described heat is delivered to the still which vaporizes the material placed therein and provides sufficient pressure to operate the turbine generator. As the vapors pass through the different stages of the turbine they are successively expanded which causes a cooling effect which condenses the fractions having the higher condensing points and thus the latent heat of the vapors is utilized for the performance of work. By the suitable design of the turbine it is possible to provide stages which will condense predetermined fractions of the material and when this apparatus is used for the distillation of oil shales it is possible to obtain a partial refinement of the oils contained therein. Thus it will be seen that my improved method provides a means for simultaneously fractionating liquids and generating power from the latent heat thereof.

It is often desirable to fractionate materials in the presence of steam, this process being known as steam distillation and my method can be applied equally as well to this process as to the ordinary form of distillation. It is only necessary to generate steam and introduce it into the still containing the material to be fractinated and I accomplish this result either by introducing water to the still or by providing a separate steam generator connected to the still.

What I claim as my invention is:—

1. The method of fractionating liquids, which consists in heating material to distill therefrom volatile constituents, and to produce mixed vapors of different condensing points and expanding said vapors in successive stages to thereby produce mechanical work at said successive stages and so condense fractions at such stages.

2. The method of fractionating liquids, which consists in heating material to distill therefrom volatile constituents, and to produce mixed vapors of different condensing points, expanding said vapors in successive stages to thereby produce mechanical work at said successive stages and by the consequent lowering of the temperature of the mixed vapors forming successive condensed fractions and collecting the condensates from the respective stages.

3. The method of simultaneously fractionating liquids and generating power, which consists in heating material to produce therefrom mixed vapors of different condensing points, expanding said vapors in successive stages to thereby produce mechanical work at said successive stages and so condense fractions at such stages, and separately collecting the condensates from said stages.

4. The method of simultaneously fractionating liquids and generating power, which consists in heating material to distill therefrom volatile constituents and to produce mixed vapors, passing the mixed vapors through a multi-stage generator to produce mechanical work and separately collecting the condensed fractions from the respective stages.

5. The method of simultaneously fractionating liquids and generating power, which consists in applying heat to a material to produce therefrom mixed vapors of different condensing points, fractionally condensing said vapors and generating mechanical power at different stages of condensation from the latent heat of the respective vapors.

6. The method of simultaneously fractionating liquids and generating power, which consists in applying heat to a plurality of liquids to vaporize said liquids and produce mixed vapors, fractionally condensing said vapors and generating mechanical power at different stages of condensation from the sensible heat of the vapors and the latent heat of the vapors.

7. The method of simultaneously fractionating liquids and generating power, which consists in volatilizing a material by steam distillation to produce a plurality of mixed vapors, expanding said vapors in successive stages to thereby produce mechanical work at said successive stages and so condense fractions at such stages, and further effecting by such expansion lowering of the temperature of the mixed vapors and separately collecting the condensates from the respective stages.

8. The method of simultaneously fractionating liquids and generating power, which consists in volatilizing a material by steam distillation to produce mixed vapors of different condensing points, passing the mixed vapors through a multi-stage turbine generator to produce mechanical work and separately collecting condensed fractions from the stages of said turbine generator.

9. The method of simultaneously fractionating vapors and generating power, which consists in expanding a plurality of mixed vapors of different condensing points in successive stages to thereby produce mechanical work at said successive stages and separately collecting condensed fractions from the respective stages.

10. The method of generating power, which consists in passing mixed vapors of different condensing points through a multi-stage turbine generator to produce mechanical work and separately collecting the condensed fractions from the respective stages.

11. The method of simultaneously fractionating liquids and generating power which consists in subjecting oil shales to steam distillation whereby mixed vapors of different condensing points are produced, passing the mixed vapors through a multi-stage turbine generator to produce mechanical work and separately collecting condensed fractions from said oil shales in the respective stages.

In testimony whereof I affix my signature.

CLARENCE F. HIRSHFELD.